United States Patent
Terry et al.

(10) Patent No.: US 7,989,562 B2
(45) Date of Patent: Aug. 2, 2011

(54) METHOD FOR PREVENTING CATALYST AGGLOMERATION BASED ON PRODUCTION RATE CHANGES

(75) Inventors: Kersten A Terry, Midland, MI (US); Mark W. Blood, Hurricane, WV (US); John H. Oskam, Flemington, NJ (US); Timothy R. Lynn, Glen Gardner, NJ (US); Bruce J. Savatsky, Kingwood, TX (US); Mark B. Davis, Lake Jackson, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 12/443,114

(22) PCT Filed: Sep. 26, 2007

(86) PCT No.: PCT/US2007/020762
§ 371 (c)(1),
(2), (4) Date: Sep. 9, 2010

(87) PCT Pub. No.: WO2008/042182
PCT Pub. Date: Apr. 10, 2008

(65) Prior Publication Data
US 2011/0040048 A1      Feb. 17, 2011

Related U.S. Application Data

(60) Provisional application No. 60/848,909, filed on Oct. 3, 2006.

(51) Int. Cl.
C08F 2/00 (2006.01)
C08F 2/34 (2006.01)
B01J 19/26 (2006.01)
B05B 7/06 (2006.01)

(52) U.S. Cl. .......... 526/59; 526/919; 422/111; 422/131; 422/140

(58) Field of Classification Search ............ 526/59, 526/919; 422/111, 131, 140
See application file for complete search history.

(56) References Cited

U.S. PATENT DOCUMENTS

| | | | |
|---|---|---|---|
| 3,078,265 A * | 2/1963 | Berger et al. | 526/61 |
| 3,628,734 A | 12/1971 | Lindell et al. | |
| 4,163,040 A | 7/1979 | Van den Bossche | |
| 4,263,166 A | 4/1981 | Adams | |
| 4,493,636 A | 1/1985 | Haldipur et al. | |
| 5,098,967 A * | 3/1992 | Asanuma et al. | 526/60 |
| 5,151,474 A | 9/1992 | Lange et al. | |
| 5,317,036 A | 5/1994 | Brady, III et al. | |
| 5,352,749 A | 10/1994 | DeChellis et al. | |
| 5,453,471 A | 9/1995 | Berbier et al. | |

(Continued)

FOREIGN PATENT DOCUMENTS

GB        618674        2/1949

*Primary Examiner* — Fred M Teskin

(57) ABSTRACT

A system and method for olefin polymerization is provided. The method includes polymerizing one or more olefins within a reactor having one or more injection tubes in fluid communication therewith, at least one of the one or more injection tubes having two or more concentric flow paths; flowing a catalyst through a first flow concentric path of the injection tube into the reactor; flowing one or more monomers through a second concentric flow path of the injection tube into the reactor; measuring rate of heat removal within the reactor; and adjusting the one or more monomers flow through the injection tube in response to the rate of heat removal in the reactor.

30 Claims, 2 Drawing Sheets

U.S. PATENT DOCUMENTS

| | | |
|---|---|---|
| 5,521,264 A | 5/1996 | Mehra et al. |
| 5,693,727 A | 12/1997 | Goode et al. |
| 5,859,157 A | 1/1999 | Gupte et al. |
| 5,948,871 A | 9/1999 | Goode et al. |
| 5,962,606 A | 10/1999 | Williams et al. |
| 6,075,101 A | 6/2000 | Lynn et al. |
| 6,096,839 A | 8/2000 | Chinh et al. |
| 6,211,310 B1 | 4/2001 | Goode et al. |
| 6,214,943 B1 | 4/2001 | Newton et al. |
| 6,362,290 B2 | 3/2002 | Durand et al. |
| 6,391,985 B1 | 5/2002 | Goode et al. |
| 6,391,986 B1 | 5/2002 | Goode et al. |
| 6,426,394 B1 | 7/2002 | Erickson et al. |
| 6,500,905 B2 | 12/2002 | Goode et al. |
| 6,513,345 B1 | 2/2003 | Betting et al. |
| 6,626,424 B2 | 9/2003 | Ngan et al. |
| 6,657,021 B2 | 12/2003 | Chamayou et al. |
| 6,759,489 B1 | 7/2004 | Turkistani |
| 6,995,235 B1 | 2/2006 | Ehrman et al. |
| 2001/0043888 A1 | 11/2001 | Ito et al. |
| 2002/0173599 A1 | 11/2002 | Goode et al. |
| 2003/0096923 A1 | 5/2003 | Chamayou et al. |
| 2004/0087743 A1 | 5/2004 | Bai et al. |

* cited by examiner

METHOD FOR PREVENTING CATALYST AGGLOMERATION BASED ON PRODUCTION RATE CHANGES

CROSS-REFERENCE TO RELATED APPLICATIONS

This application is a National Stage application under 36 U.S.C. §371 of International Application No. PCT/US2007/020762, filed Sep. 26, 2007, that claims the benefit of Ser. No. 60/848,909, filed Oct. 3, 2006, the disclosures of which are incorporated by reference.

FIELD OF THE INVENTION

Embodiments of the present invention generally relate to a method and system for olefin polymerization.

BACKGROUND

In olefin polymerization, especially gas phase polymerization, the rate of heat generation is directly related to the production rate of polymer. The production rate is typically controlled by adjusting the rate of catalyst injection and the concentration of monomer(s) in the reaction zone. The rate of catalyst injection changes the reaction rate and thus the rate at which heat is generated in the bed.

However, the catalyst should be dispersed uniformly throughout the reaction materials to promote uniform polymerization. An effective dispersal of catalyst within the reactor avoids fouling and promotes uniform, consistent production of polymer product. Therefore, the catalyst cannot simply be dumped into the reactor at a faster rate without any consideration for dispersion within the reaction materials. In other words, increased catalyst addition does not increase production rate if not properly dispersed.

Liquid catalysts are commonly used in gas phase polymerization. Liquid catalysts require less equipment and raw materials to make. Liquid catalysts also impart fewer impurities to the final polymer product. Further, the activity of liquid catalysts is not adversely influenced by the surface area of a support material. However, the proper dispersal of liquid catalysts into a reactor is difficult.

An effective dispersal of liquid catalyst within the reactor presents several challenges. For example, the liquid catalyst is typically soluble in the reaction medium and can deposit on the resin or polymer forming in the reactor, accelerating polymerization on the surface of the particles of the bed. As the coated resin particles increase in size, the particles are exposed to a higher fraction of catalyst solution or spray because of the increased cross-sectional dimensions. If too much catalyst is deposited on the polymer particles, the polymer particles can grow so large that the particles cannot be fluidized, causing the reactor to be shut down.

Further, the initial polymerization rate upon liquid catalyst injection to the reactor can be so high that the newly formed polymer or resin particles can soften or melt. Such softened or melted polymer can adhere to one another and form larger particles in the fluidized bed. Such large particles are difficult to fluidize and consequently, plug the reactor, requiring the reactor to be shut down.

Conversely, poor dispersion of the catalyst can cause entrainment. Entrainment can occur if the polymer particle size is too small. Entrained particles can foul recycle lines, compressors, and coolers. Entrained particles can also increase static electricity which can cause sheeting in the reactor.

Moreover, newly developed catalysts with high catalytic activity present many new challenges. Such new catalysts typically have high initial activity and polymerize before being dispersed in the reactor bed. As such, these highly active catalysts are even more prone to unwanted agglomerate formation and fouling.

Various nozzles have been proposed to inject and better disperse liquid catalyst into reactor systems. For example, U.S. Pat. No. 4,163,040 discloses a catalyst spray nozzle that utilizes a biased valve member to regulate catalyst flow. U.S. Pat. No. 5,693,727 discloses a catalyst spray nozzle that utilizes a shroud about a central injection tube. Each of those nozzle designs can suffer from the problems of accelerated polymer growth discussed above as well as particle growth and accumulation on the nozzle itself. U.S. Pat. Nos. 5,962,606 and 6,075,101 disclose a perpendicular catalyst spray nozzle and an effervescent catalyst spray nozzle. U.S. Pat. Nos. 6,211,310 and 6,500,905 disclose a catalyst spray nozzle having concentric tubes to flow a cleaning gas and deflecting gas along with the catalyst. Other background references include GB 618 674 A.

However, accelerated polymer growth and polymer accumulation on the nozzle remain a problem. Such particle growth and accumulation can plug the nozzle which decreases the rate of catalyst injection if not block the injection all together. As a result, production rate decreases as does the heat of reaction. Moreover, simply increasing the rate of catalyst injection or modifying monomer concentration does nothing to alleviate the problem. Instead, the nozzles are pulled from the reactor and cleaned which is disruptive to the polymerization process.

To prevent or anticipate reactor plugging, particle size data can be used to monitor catalyst dispersion. However, particle size data requires a sample from the reactor and time to analyze. This procedure is labor intensive and time consuming resulting in long lapses between sampling and the characterization of the sample. As a result of such delay between sampling and generation of data, the sample characterization provides an evaluation that lags behind the actual status of the system by several hours. In the meantime, serious fouling and agglomerates may have been generated.

There is a need, therefore, for a method for monitoring catalyst dispersion, and a need for a method for polymerization that controls catalyst dispersion based on production rate. Further, there is a need for a method for polymerization that uses a liquid catalyst and is capable of controlling polymer growth and particle size.

SUMMARY OF THE INVENTION

A method for olefin polymerization is provided. In at least one specific embodiment, the method comprises polymerizing one or more olefins within a reactor having one or more injection tubes in fluid communication therewith, at least one of the one or more injection tubes having two or more concentric flow paths; flowing a catalyst through a first flow concentric path of the injection tube into the reactor; flowing one or more monomers through a second concentric flow path of the injection tube into the reactor; measuring rate of heat removal within the reactor; and adjusting the one or more monomers flow through the injection tube in response to the rate of heat removal in the reactor.

A method for effecting process control in olefin polymerization is also provided. In at least one other specific embodiment, such method comprises polymerizing one or more olefins within a reactor having one or more injection tubes in fluid communication therewith, at least one of the one or more injection tubes having two or more concentric flow paths; flowing a catalyst through a first concentric flow path of the injection tube into the reactor; flowing one or more monomers through a second concentric flow path of the injection tube into the reactor; measuring rate of heat removal within the reactor; and adjusting the one or more monomers flow through the injection tube in response to the rate of heat removal in the reactor.

Further, a system for olefin polymerization is provided. In at least one specific embodiment, the system comprises a reactor having a fluidized bed comprising polymer particles; one or more injection tubes in fluid communication with the reactor, at least one of the one or more injection tubes having two or more concentric flow paths, wherein a first concentric flow path is adapted to deliver a liquid catalyst system to the reactor and a second concentric flow path is adapted to deliver one or more monomers the reactor; means for separating the polymer particles; a recycle gas stream; and means for measuring rate of heat removal within the reactor and a second concentric flow path is adapted to deliver one or more monomers to the reactor.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
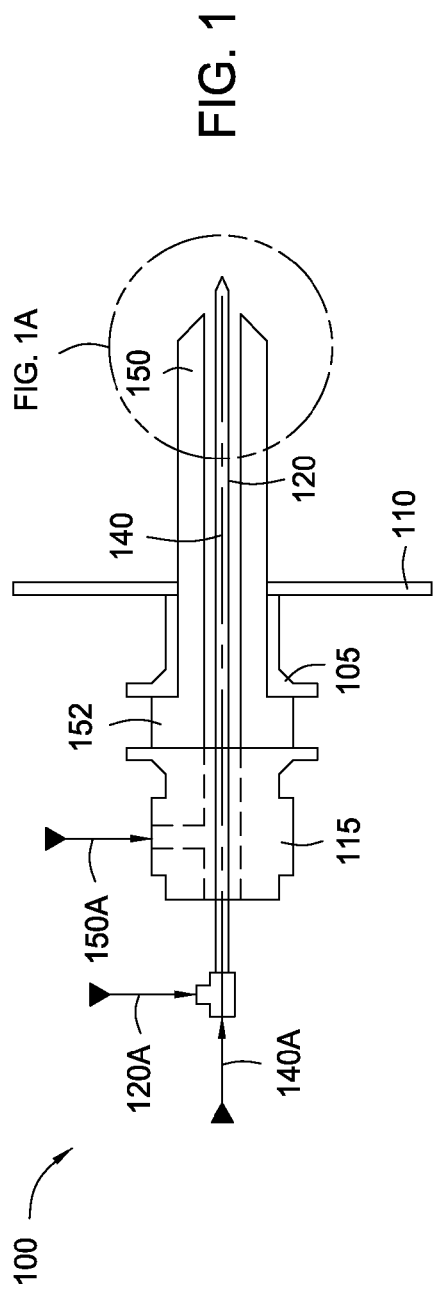
FIG. 1 depicts a schematic diagram of an illustrative injection nozzle for olefin polymerization.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

A system and method to continuously monitor catalyst dispersion and production rate is described. In one or more embodiments, the system and methods can monitor production rate as a function of the heat of reaction and/or the rate of heat removal. Accordingly, changes in catalyst dispersion can be detected more frequently and production rate can be controlled in almost real time.

The system and method can be implemented with any system for olefin polymerization. Suitable polymerization processes include solution, gas phase, bulk, solution, slurry and a high pressure process, or a combination thereof. A desirable process is a gas phase or slurry phase polymerization of one or more olefins at least one of which is ethylene or propylene. As used herein, the term "liquid catalyst" refers to both solution and slurry catalysts.

In one or more embodiments, the reaction catalyst in which dispersion is monitored can be injected into a polymerization process using one or more nozzles or injection tubes. Any nozzle or injection tube having two or more concentric flow paths can be used. In one or more embodiments, a catalyst for olefin polymerization flows through a first concentric flow path of the nozzle into the reactor. One or more monomers flow through a second concentric flow path of the nozzle into the reactor. The rate of heat removal from the reactor is measured and the flow of the one or more monomers through the nozzle is adjusted in response to the rate of heat removal.

Suitable nozzles include both perpendicular injection nozzles and effervescent nozzles such as those described in U.S. Pat. Nos. 5,693,727; 5,962,606; and 6,500,905. A perpendicular nozzle combines the gas and liquid and the mixture exits the nozzle through an orifice in a direction perpendicular to the flow direction. With effervescent nozzles, a first fluid (e.g. catalyst or catalyst solution) is passed through an inner tube, while a second fluid (e.g. atomization gas) is passed concurrently through an annular space defined by the inner tube and a concentric outer tube. The direction of flow of the two fluids is generally along the central axis of the tubes. The two fluids gases are fed through their respective inlets and exit through a common orifice at the spray tip. One or more holes (orifices) on the inner tube allow the first fluid to contact the second fluid. The second fluid is introduced into the concurrent flowing first fluid near the common exit orifice. In this way, liquid slugging is prevented and steady droplet formation occurs. Gas bubbles which are formed are forced through an orifice at the tip of the outer tube, forcing the concurrent flow of liquid along the outside edge of the orifice. The thin film of liquid on the orifice wall is ejected from the orifice in thin sheets which disintegrate into small droplets. The gas bubbles are thought to rapidly increase in volume as they emerge from the orifice, providing additional energy which shatters the liquid into small droplets.

FIG. 1 depicts a schematic diagram of an illustrative injection nozzle 100 suitable for use herein. The nozzle 100 includes a first conduit 120, second conduit 140, and support member 150. The first conduit 120 surrounds an outer surface (i.e. outer diameter) of the second conduit 140, and the support member 150 at least partially surrounds an outer diameter of the first conduit 120. Accordingly, both the first conduit 120 and the second conduit 140 are at least partially surrounded by the support member 150.

Figure 1A:
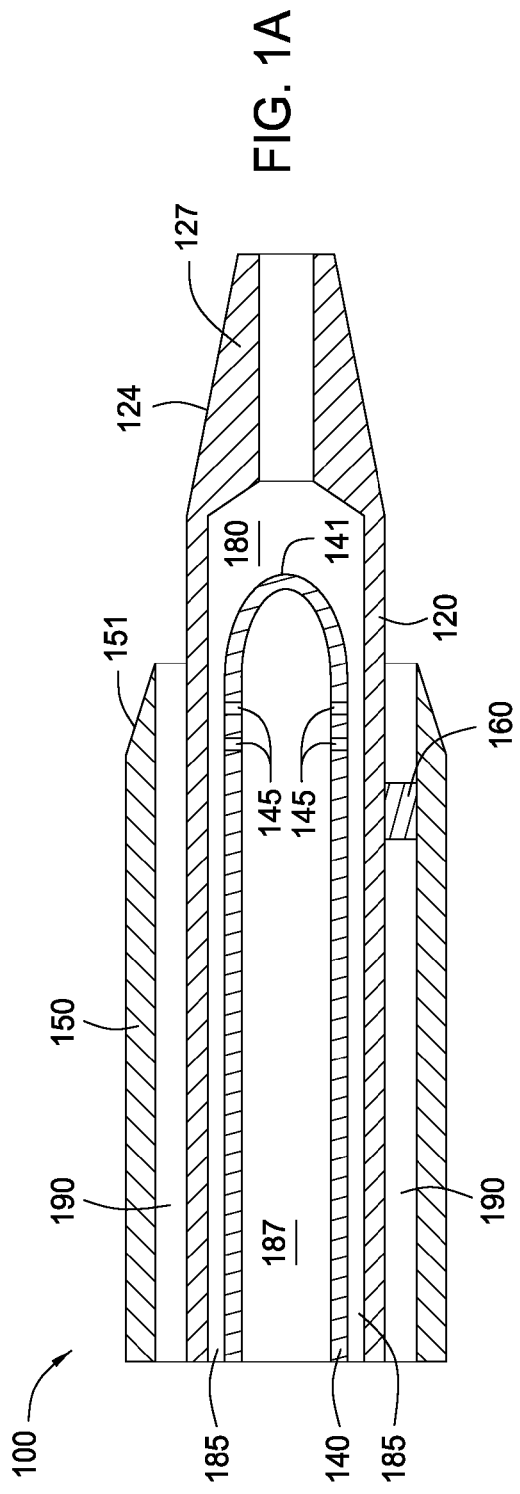
FIG. 1A depicts an enlarged schematic of the injection nozzle shown in FIG. 1.

FIG. 1A depicts an enlarged, schematic diagram of the injection nozzle 100 shown in FIG. 1. Referring to FIGS. 1 and 1A, the first conduit 120 surrounds an outer surface (i.e. outer diameter if conduit 140 is tubular) of the second conduit 140 defining an annulus or zone ("first annulus") 185 therebetween. The first conduit 120, second conduit 140, and annulus 185 are at least partially disposed within the support member 150. The outer diameter of the first conduit 120 and the inner diameter of the support member 150 define an annulus or zone ("second annulus") 190 therebetween. In one or more embodiments, the first conduit 120, second conduit 140 and support member 150 are concentric.

One or more spacers 160 can be disposed about an inner surface (i.e. inner diameter) of the support member 150 or about the outer surface (i.e. outer diameter) of the first conduit 120. Preferably, the one or more spacers 160 are attached to outer surface of the first conduit 120. The one or more spacers 160 center the first conduit 120 within the annulus 190. Any number of spacers 160 can be used. Each spacer 160 is preferably as thin as possible so not to impede or obstruct the flow path within the annulus 190, and is constructed of a material with enough strength to maintain a fixed distance between the first conduit 120 and the support member 150 during operation of the nozzle 100. Suitable materials include aluminum and stainless steel, for example. In one or more embodiments, the spacer 160 has a length to thickness ratio of about 10:1 or 20:1 or 30:1 or 40:1 or 50:1. Preferably, three spacers 160 are equally spaced about the outer diameter of the first conduit 120. However, any radial configuration and spacing can be used.

The spacers 160 can be located about 0.5 in. (1.27 cm), about 1 in. (2.54 cm), about 1.5 in. (3.81 cm), about 2 in. (5.08 cm), or about 3 in. (7.62 cm) from the discharge end of the nozzle 100. In one or more embodiments, the spacers 160 are located between about 0.5 in. (1.27 cm) and about 1 in. (2.54 cm) from the end of the nozzle 100. For example, the spacers 160 can be located about 1⅝ inches (in.) (4.1 cm) from the end of the nozzle 100. In one or more embodiments above or elsewhere herein, each spacer 160 can be located at a different distance from the end of the nozzle 100. For example, each spacer 160 can range from about 0.5 in. (1.27 cm) to about 3 in. (7.62 cm) from the end of the nozzle 100.

Second Conduit 140

Referring to FIG. 1A, the second conduit 140 has a passageway 187 therethrough. The second conduit 140 includes a first end 141 proximal to the discharge end of nozzle, that is preferably welded shut into a semi-spherical tip and a second end (not shown) adapted to receive fluids into the passageway 187. The second conduit 140 also includes a plurality of apertures, holes or orifices 145 that allow the one or more fluids passing therethrough to exit the second conduit 140. The orifices 145 are designed and positioned about the second conduit 140 to provide a consistent and uniform dispersion of the fluid flowing therethrough into the surrounding annulus 185. In one or more embodiments, the number of orifices 145 formed in the second conduit 140 ranges from about 1 to 1000, preferably 10 to 100, more preferably 10 to 20. In one or more embodiments, each orifice 145 has an inner diameter ranging from a low of about 0.01 cm, 0.03 cm, or 0.05 cm to a high of about 0.06 cm, 0.08 cm, or 1.0 cm.

In an embodiment, the orifices 145 are equally spaced about the diameter and length of the second conduit 140. In at least one specific embodiment, two lines of two or more orifices 145 are disposed axially about the diameter of the second conduit 140 although any number of lines can be used such as three or four depending on flow rates and production requirements. Each line can be arranged in a helical pattern along the length of the second conduit 140. In other words, each orifice 145 in a line can be spaced radially and axially from one another.

Likewise, each orifice 145 in a line can be radially offset from an orifice 145 of another line. For instance, an orifice 145 from a first line is preferably offset by about 90 degrees to 180 degrees from an axially corresponding orifice 145 of the second line. In a three line arrangement, axially corresponding orifices 145 are preferably offset by about 120 degrees from one another, although any degree of spacing can be used.

In one or more embodiments, the orifices 145 in a given line have the same shape and size. In one or more embodiments, the orifices 145 in a given line have different shapes and sizes. In one or more embodiments, the orifices 145 in a given line have the same shape and size as the orifices 145 of one or more different lines. In one or more embodiments, the orifices 145 in a given line have different shapes and sizes than the orifices 145 of one or more different lines.

The second conduit 140 can have an inner diameter ranging from about 1/16" (0.159 cm) to ½" (1.27 cm), preferably about 0.085" (0.2159 cm) to ¼" (0.635 cm). The portion of the second conduit 140, over which the holes are drilled, can range from about 0.5 and 25 cm in length although the holes are preferably present in the last about 1 to 2 cm of the second conduit 140 (i.e. from the first end 141).

In relation to the first conduit 120, the second conduit 140 can be positioned so that the first end 141 is positioned less than about 3" (7.6 cm) from the end of the first conduit 120. In one or more embodiments, the first end 141 of the second conduit 140 is positioned about 0.5 in. (1.27 cm) to about 3 in. (7.62 cm) from the end of the first conduit 120. In one or more embodiments, the first end 141 of the second conduit 140 is positioned about 0.5 in. (1.27 cm) to about 1.5 in. (3.81 cm) from the end of the first conduit 120. In one or more embodiments, the first end 141 of the second conduit 140 is positioned about 0.5 in. (1.27 cm) to about 1 in. (2.54 cm) from the end of the first conduit 120.

First Conduit 120

Considering the first conduit 120 in more detail, the first conduit 120 defines a passageway or annulus 185 therethrough. Turbulence from the fluid(s) exiting the tip of the first conduit 120 creates back-flow that can deposit catalyst on the outer diameter thereof. Such deposit can subsequently undergo polymerization and foul the nozzle 100. Accordingly, at least a portion of the outer diameter 124 of the tip section 127 is tapered or converges to a point ("spray tip").

The spray tip can have a variety of cross sectional configurations including but not limited to circular, elliptical, oval, square, rectangular, polygonal or parabolic. The taper angle can vary depending on process requirements and flow rates of catalyst injection. Suitable taper angles range from a low of about 4°, 5°, or 6° to a high of about 10°, 15° or 20°. Higher taper angles can be tolerated given that the taper off horizontal is gradual. Preferably, the taper angle ranges from about 5° to about 10°. In one or more embodiments, the taper angle is about 7°.

A small tip section 127 can help prevent fouling by providing a smaller surface area for catalyst and polymer to accumulate. Preferably, the tip section 127 has an annular thickness of between 0.01 in. (2.54 mm) and 0.062 (1.57 mm) in order to minimize fouling while maintaining adequate strength.

The first conduit 120 can have an inner diameter ranging from about 0.125 in. (0.318 cm) to about 3 in. (7.62 cm). In one or more embodiments, the first conduit 120 can have an inner diameter ranging from about 0.125 in. (0.318 cm) to about 1.5 in. (3.81 cm). In one or more embodiments, the first conduit 120 can have an inner diameter ranging from about 0.125 in. (0.318 cm) to about 0.5 in. (1.27 cm).

In one or more embodiments, the first conduit 120 is positioned within the support member 150 such that the end of the first conduit 120 extends about 1" (2.5 cm) from the end of the support member 150. In one or more embodiments, the end of the first conduit 120 extends about 1 inch to about 3 inches from the end of the support member 150. In one or more embodiments, the end of the first conduit 120 extends about 1.5 inches from the end of the support member 150.

As mentioned above, the first conduit 120 can be positioned so that the end of the first conduit 120 extends about 3" (7.6 cm) or less from the first end 141 of the second conduit 140. In one or more embodiments, the end of the first conduit 120 extends about 0.5 in. (1.27 cm) to about 3 in. (7.62 cm) from the first end 141 of the second conduit 140. In one or more embodiments, the end of the first conduit 120 extends about 0.5 in. (1.27 cm) to about 1.5 in. (3.81 cm) from the first end 141 of the second conduit 140. In one or more embodiments, the end of the first conduit 120 extends about 0.5 in. (1.27 cm) to about 1 in. (2.54 cm) from the first end 141 of the second conduit 140.

Support Member 150

The support member 150 can be any protective shroud that at least partially covers the first conduit 120 and the second conduit 140. The cross section of the support member 150 can be any shape. For example, the cross section of the support member 150 can be circular, square, rectangular, polygonal, elliptical, or oval, just to name a few.

In an embodiment, the support member 150 includes a first end having a flanged section 152, as depicted in FIG. 1. The support member 150 also includes a second end proximal to the discharge end of nozzle 100 that is open to allow a fluid to flow therethrough. In one or more embodiments, the support member 150 is secured to a reactor wall 110. In one or more embodiments, the flanged section 152 can be adapted to mate or abut up against a flanged portion 105 of the reactor wall 110 as shown. Any other conventional way for securing or fastening tubing or piping can be used.

In a preferred embodiment, if the support member comprises a tubular shaped member, the support member 150 should have an inner diameter large enough to surround the first conduit 120. In one or more embodiments, the inner diameter of the support member 150 is greater than about 0.5 in. (1.27 cm), greater than about 0.625 in. (1.59 cm), or greater than about 0.75 in. (1.91 cm). In one or more embodiments, the inner diameter of the support member 150 ranges from a low of about 0.5 in. (1.27 cm) to a high of about 0.75 in. (1.91 cm). In one or more embodiments, the inner diameter of the support member 150 ranges from a low of about 0.5 in. (1.27 cm) to a high of about 0.625 in. (1.59 cm). In one or more embodiments, the inner diameter of the support member 150 ranges from a low of about 0.625 in. (1.59 cm) to a high of about 0.75 in. (1.91 cm).

Referring to FIG. 1A, in one or more embodiments, at least a portion of the support member 150 has a tapered outer diameter 151. The second end ("open end") of the support member 150 is preferably tapered to reduce the wall thickness at the tip of the support member 150. As described above with reference to the end of the second conduit 120, minimizing the area at the tip of the support member 150 helps prevent fouling. Fouling can be caused due to agglomerate formation of polymer on the nozzle 100.

Feed Lines

Referring to FIGS. 1 and 1A, the injection nozzle 100 is in fluid communication with one or more feed lines (three are shown in FIG. 1) 120A, 140A, 150A. Each feed line 120A, 140A, 150A provides an independent flow path for one or more monomers, purge gases, and catalyst and/or catalyst systems to any one or more of the passageway 187, annulus 185, or annulus 190. For example, feed line ("first feed line") 120A can be in fluid communication with the annulus 185 defined by the inner surface of the first conduit 120 and the outer surface of the second conduit 140. In one or more embodiments above or elsewhere herein, a feed line ("second feed line") 140A can be in fluid communication with passageway 187 within the second conduit 140. In one or more embodiments above or elsewhere herein, a feed line ("third feed line") 150A can be in fluid communication with the annulus 190 defined by the inner surface of the support member 150 and the outer surface of the first conduit 120.

Any of the one or more catalyst or catalyst systems, purge gases and monomers can be injected into any of the one or more feed lines 120A, 140A, 150A. In one or more embodiments above or elsewhere herein, the one or more catalyst or catalyst systems can be injected into the first conduit 120 using the first feed line 120A ("catalyst feed line"). The one or more purge gases or inert gases can be injected into the second conduit 140 using the second feed line 140A ("purge gas feed line"). The one or more monomers can be injected into the support member 150 using the third feed line 150A ("monomer feed line"). The feed lines 120A, 140A, 150A can be any conduit capable of transporting a fluid therein. Suitable conduit can include tubing, flex hose, and pipe. A three way valve 115 can be used to introduce and control the flow of the fluids (i.e. catalyst, purge gas and monomer) to the injection nozzle 100. Any commercially available three way valve can be used.

Operation of Nozzle

By way of example, in an embodiment of the invention, a catalyst slurry is introduced to the nozzle 100 via line 120A as depicted in FIG. 1. Referring to FIGS. 1 and 1A, the catalyst slurry flows through the annulus 185 between the first conduit 120 and the second conduit 140. The catalyst slurry can have a flow rate of about 1 lb per hour (lb/hr) (0.4 kg/hr) to about 50 lb/hr (23 kg/hr); or about 3 lb/hr (1.4 kg/hr) to about 30 lb/hr (14 kg/hr); or about 5 lb/hr (2.3 kg/hr) to about 10 lb/hr (4.5 kg/hr) through the annulus 185. Preferably, the catalyst contains fully formed catalyst particles suspended in one or more inert liquids. In one or more embodiments, the catalyst particles are at least partially dissolved in one or more inert liquids. In one or more embodiments, the catalyst particles are substantially if not completely dissolved in the one or more inert liquids. The catalyst particles can include one or more catalysts, catalyst systems or combinations thereof.

Suitable inert liquids include but are not limited to non-functional hydrocarbons and aliphatic hydrocarbons such as butane, isobutane, ethane, propane, pentane, isopentane, hexane, octane, decane, dodecane, hexadecane, octadecane, and the like; alicyclic hydrocarbons such as cyclopentane, methylcyclopentane, cyclohexane, cyclooctane, norbornane, ethylcyclohexane and the like; aromatic hydrocarbons such as benzene, toluene, ethylbenzene, propylbenzene, butylbenzene, xylene, and the like; and petroleum fractions such as gasoline, kerosene, light oils, and the like. Likewise, halogenated hydrocarbons such as methylene chloride, chlorobenzene, and the like, can also be used. By "non-functional", it is meant that the liquids do not contain groups such as strong polar groups which can deactivate the active transition metal sites of the catalyst compound(s).

One or more inert purge gases can be introduced to the nozzle 100 via line 140A. The inert purge gas(es) flow through the passageway 187 within the second conduit 140 and are dispersed into at least a portion of the annulus 185 via the one or more orifices 145 arranged about the second conduit 140. The exiting inert gases mix with the catalyst when contacted within the annulus 185 and further mix in the mixing zone 180 prior to exiting nozzle 100 through the injection tip 127.

The flow rate of the purge gas should be sufficient to deliver a finely sprayed mix of catalyst from the end of the nozzle. In one or more embodiments, the purge gas flow rate is between about 1 lb/hr (0.4 kg/hr) and about 20 lb/hr (9.1 kg/hr). In one or more embodiments, the purge gas flow rate is between about 3 lb/hr (1.3 kg/hr) and about 15 lb/hr (6.8 kg/hr). In one or more embodiments, the purge gas flow rate ranges from a low of about 1 lb/hr (0.4 kg/hr), 2 lb/hr (0.8 kg/hr), or 4 lb/hr (1.6 kg/hr) to a high of about 8 lb/hr (3.2 kg/hr), 13 lb/hr (5.9 kg/hr), or 20 lb/hr (9.1 kg/hr).

The resulting catalyst particle population per droplet exiting the nozzle 100 is preferably small enough to prevent or reduce agglomerate formation. For example, the resulting droplet size exiting the nozzle 100 is preferably greater than about 30 microns and less than about 200 microns. In one or more embodiments, the resulting droplet size exiting the nozzle 100 can range from about 50 microns to about 150 microns.

Still referring to FIGS. 1 and 1A, one or more monomers flow through the annulus 190 defined between the support tube 150 and the first conduit 120. The one or more monomers can be introduced to the annulus 190 of the nozzle 100 through the line 150A. The monomer flow keeps the catalyst injection area clean and provides stable operation by preventing catalyst accumulation and fouling on the outer surface of the first conduit 120. The monomer should flow at a sufficient rate to sweep the outer diameter of the first conduit 120. If the monomer flow is low, then catalyst rich polymeric chunks can form on the discharge end of the first conduit 120. This will reduce the efficiency of the catalyst which will be indicated by a reduction of production rate. Another function of this flow of monomer in annulus 190 in the described nozzle system is that it disperses catalyst into the reactor in such a way that polymer agglomerates in the reactor are reduced or eliminated.

In one or more embodiments, the monomer flow is between about 1,000 lb/hr and about 5,000 lb/hr (455 kg/hr to 2,273 kg/hr). In one or more embodiments, the monomer flow is between 2,000 and 3,000 lb/hr (907 kg/hr to 1360 kg/hr). In one or more embodiments, the monomer flow ranges from a low of about 1,000 lb/hr (455 kg/hr), 1,500 lb/hr (682 kg/hr), or 2,000 lb/hr (907 kg/hr) to a high of about 2,200 lb/hr (1,000 kg/hr), 2,500 lb/hr (1,136 kg/hr), or 3,000 lb/hr (1,360 kg/hr).

In one or more embodiments, the monomer flow is less than about 30% by weight of the one or more monomers consumed in the reactor. In one or more embodiments, the monomer flow is less than about 25% by weight of the one or more monomers consumed in the reactor. In one or more embodiments, the monomer flow is less than about 20% by weight of the one or more monomers consumed in the reactor.

The catalyst discharge and inert purge gas flow through the injection tip 127 and exit the end of the nozzle 100 into the reactor. The mixture of catalyst and inert gas is delivered into the monomer flow through the support tube 150 and dispersed into the fluidized bed of polymer. The combined action of the primary atomization from exiting the injection tip 127 and the secondary atomization from interaction with the support tube flow makes small droplets that are well dispersed into the fluidized bed, thereby reducing agglomeration of the catalyst particles.

Polymerization

Figure 2:
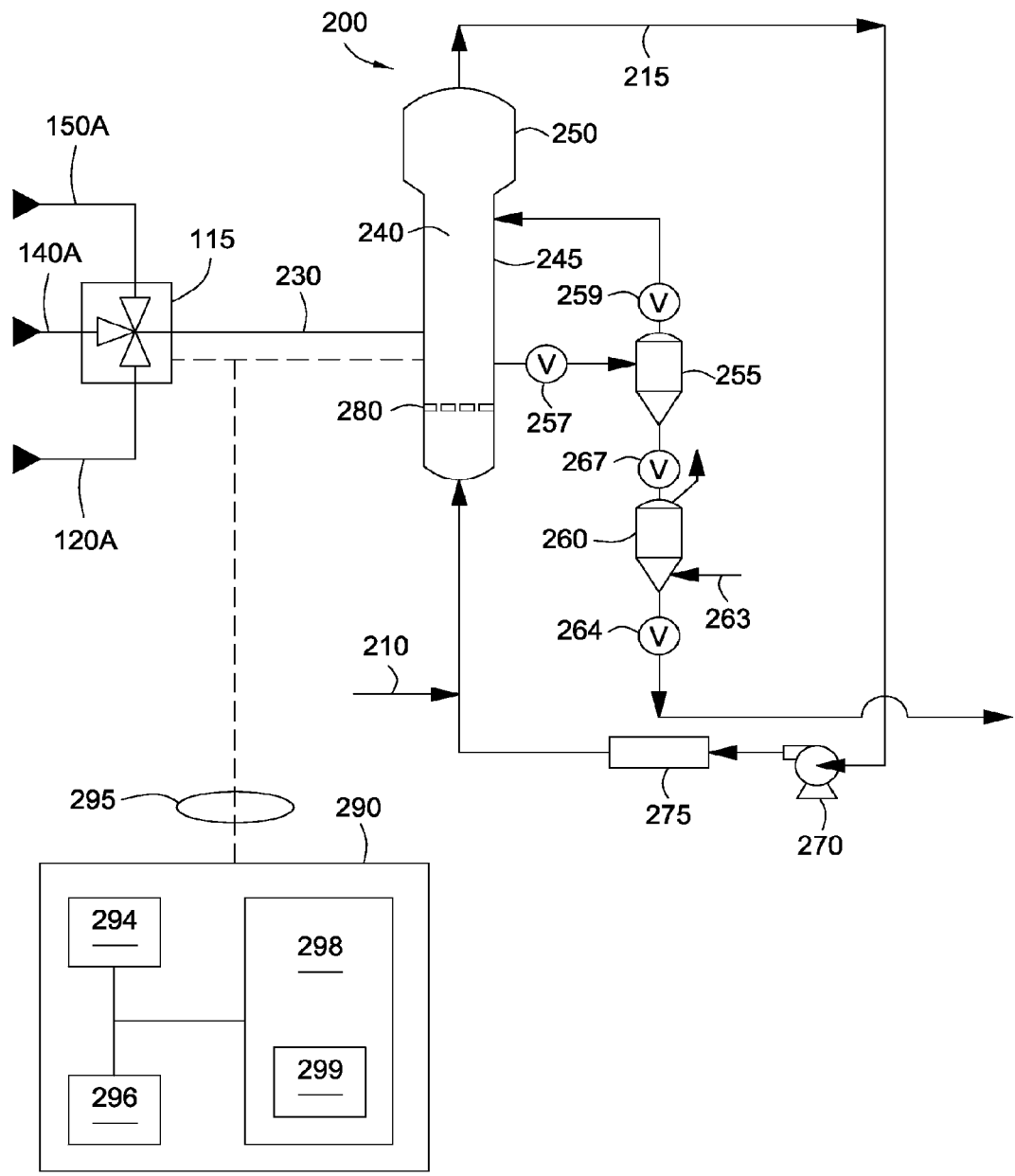
FIG. 2 depicts a flow diagram of an illustrative gas phase system for making polyolefin.

FIG. 2 depicts a flow diagram of an illustrative gas phase system that can be used in accordance with one or more embodiments described. The system 200 includes a reactor 240 in fluid communication with one or more discharge tanks 255 (only one shown), surge tanks 260 (only one shown), recycle compressors 270 (only one shown), and heat exchanger 275 (only one shown). The polymerization system 200 can also include more than one reactor 240 arranged in series, parallel, or configured independent from the other reactors, each reactor having its own associated tanks 255, 260, compressors 270 and heat exchangers 275 or alternatively, sharing any one or more of the associated tanks 255, 260, compressors 270 and heat exchangers 275. For simplicity and ease of description, embodiments of the invention will be further described in the context of a single reactor train.

In one or more embodiments, the reactor 240 can include a reaction zone 245 in fluid communication with a velocity reduction zone 250. The reaction zone 245 can include a bed of growing polymer particles, formed polymer particles and catalyst particles fluidized by the continuous flow of polymerizable and modifying gaseous components in the form of make-up feed and recycle fluid through the reaction zone 245.

A feed stream or make-up stream 210 can be introduced into the polymerization system at any point. For example, the feed stream or make-up stream 210 can be introduced to the reactor fluid bed in the reaction zone 245 or to the expanded section 250 or to any point within the recycle stream 215. Preferably, the feed stream or make-up stream 210 is introduced to the recycle stream 215 before or after the heat exchanger 275. In FIG. 2, the feed stream or make-up stream 210 is depicted entering the recycle stream 215 after the heat exchanger ("cooler") 275.

The term "feed stream" as used herein refers to a raw material, either gas phase or liquid phase, used in a polymerization process to produce a polymer product. For example, a feed stream may be any olefin monomer including substituted and unsubstituted alkenes having two to 12 carbon atoms, such as ethylene, propylene, butene, pentene, 4-methyl-1-pentene, hexene, octene, decene, 1-dodecene, styrene, and derivatives thereof. The feed stream also includes non-olefinic gas such as nitrogen and hydrogen. The feeds may enter the reactor at multiple and different locations. For example, monomers can be introduced into the polymerization zone in various ways including direct injection through a nozzle (not shown in the drawing) into the bed. The feed stream can further include one or more non-reactive alkanes that may be condensable in the polymerization process for removing the heat of reaction. Illustrative non-reactive alkanes include, but are not limited to, propane, butane, isobutane, pentane, isopentane, hexane, isomers thereof and derivatives thereof.

The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone 245, the superficial gas velocity through the bed must exceed the minimum flow required for fluidization. Preferably, the superficial gas velocity is at least two times the minimum flow velocity. Ordinarily, the superficial gas velocity does not exceed 5.0 ft/sec and usually no more than 2.5 ft/sec is sufficient.

In general, the height to diameter ratio of the reaction zone 245 can vary in the range of from about 2:1 to about 5:1. The range, of course, can vary to larger or smaller ratios and depends upon the desired production capacity. The cross-sectional area of the velocity reduction zone 250 is typically within the range of about 2 to about 3 multiplied by the cross-sectional area of the reaction zone 245.

The velocity reduction zone 250 has a larger inner diameter than the reaction zone 245. As the name suggests, the velocity reduction zone 250 slows the velocity of the gas due to the increased cross sectional area. This reduction in gas velocity allows particles entrained in the upward moving gas to fall back into the bed, allowing primarily only gas to exit overhead of the reactor 240 through recycle gas stream 215.

The recycle stream 215 can be compressed in the compressor 270 and then passed through the heat exchanger 275 where heat is removed before it is returned to the bed. The heat exchanger 275 can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream 215 is returned to the reactor 240. The cooled recycle stream absorbs the heat of reaction generated by the polymerization reaction. In one or more embodiments above or elsewhere herein, condensing mode operation such as described in U.S. Pat. Nos. 4,543, 399; 4,588,790; 5,352,749; and 5,462,999 can be used to assist in heat removal from the reactor 240.

In one or more embodiments, the recycle stream 215 is returned to the reactor 240 and to the fluidized bed through a gas distributor plate 280. A gas deflector 280 is preferably installed at the inlet to the reactor to prevent contained polymer particles from settling out and agglomerating into a solid mass and to prevent liquid accumulation at the bottom of the reactor as well to facilitate easy transitions between processes which contain liquid in the cycle gas stream and those which do not and vice versa. An illustrative deflector suitable for this purpose is described in U.S. Pat. No. 4,933,415 and U.S. Pat. No. 6,627,713.

The catalyst or catalyst system is preferably introduced to the fluidized bed within the reactor 240 through the one or more injection nozzles 100, previously described, in fluid communication with stream 230. The catalyst or catalyst system is preferably introduced as pre-formed particles in one or more liquid carriers (i.e. a catalyst slurry). Suitable liquid carriers include mineral oil and liquid hydrocarbons including but not limited to propane, butane, isopentane, hexane, heptane and octane, or mixtures thereof. A gas that is inert to the catalyst slurry such as, for example, nitrogen or argon can also be used to carry the catalyst slurry into the reactor 240. In one or more embodiments, the catalyst or catalyst system can be a dry powder. In one or more embodiments, the catalyst or catalyst system can be dissolved in the liquid carrier and introduced to the reactor 240 as a solution.

On discharge of particulate polymer product from reactor 240, it is desirable and preferable to separate fluid from the product and to return the fluid to the recycle line 215. In one or more embodiments, this separation is accomplished when fluid and product leave the reactor 240 and enter the product discharge tanks 255 (one is shown) through valve 257, which may be a ball valve designed to have minimum restriction to flow when opened. Positioned above and below the product discharge tank 255 are conventional valves 259, 267. The valve 267 allows passage of product into the product surge tanks 260 (only one is shown).

In at least one embodiment, to discharge particulate polymer from reactor 240, valve 257 is opened while valves 259, 267 are in a closed position. Product and fluid enter the product discharge tank 255. Valve 257 is closed and the product is allowed to settle in the product discharge tank 255. Valve 259 is then opened permitting fluid to flow from the product discharge tank 255 to the reactor 245. Valve 259 is then closed and valve 267 is opened and any product in the product discharge tank 255 flows into the product surge tank 260. Valve 267 is then closed. Product is then discharged from the product surge tank 260 through valve 264. The product can be further purged via purge stream 263 to remove residual hydrocarbons and conveyed to a pelletizing system or to storage (not shown). The particular timing sequence of the valves 257, 259, 267, 264 is accomplished by the use of conventional programmable controllers which are well known in the art.

Another preferred product discharge system which can be alternatively employed is that disclosed and claimed in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed.

The fluidized-bed reactor is equipped with an adequate venting system (not shown) to allow venting the bed during start up and shut down. The reactor does not require the use of stirring and/or wall scraping. The recycle line 215 and the elements therein (compressor 270, heat exchanger 275) should be smooth surfaced and devoid of unnecessary obstructions so as not to impede the flow of recycle fluid or entrained particles.

The conditions for polymerizations vary depending upon the monomers, catalysts, catalyst systems, and equipment availability. The specific conditions are known or readily derivable by those skilled in the art. For example, the temperatures are within the range of from about −10° C. to about 120° C., often about 15° C. to about 110° C. Pressures are within the range of from about 0.1 bar to about 100 bar, such as about 5 bar to about 50 bar, for example. Additional details of polymerization can be found in U.S. Pat. No. 6,627,713, which is incorporated by reference at least to the extent it discloses polymerization details.

Catalyst System

The catalyst system can include Ziegler-Natta catalysts, chromium-based catalysts, metallocene catalysts and other single-site catalysts including Group 15-containing catalysts bimetallic catalysts, and mixed catalysts. The catalyst system can also include $AlCl_3$, cobalt, iron, palladium, chromium/chromium oxide or "Phillips" catalysts. Any catalyst can be used alone or in combination with the others. In one or more embodiments, a "mixed" catalyst is preferred.

The term "catalyst system" includes at least one "catalyst component" and at least one "activator", alternately at least one cocatalyst. The catalyst system can also include other components, such as supports, and is not limited to the catalyst component and/or activator alone or in combination. The catalyst system can include any number of catalyst components in any combination as described, as well as any activator in any combination as described.

The term "catalyst component" includes any compound that, once appropriately activated, is capable of catalyzing the polymerization or oligomerization of olefins. Preferably, the catalyst component includes at least one Group 3 to Group 12 atom and optionally at least one leaving group bound thereto.

The term "leaving group" refers to one or more chemical moieties bound to the metal center of the catalyst component that can be abstracted from the catalyst component by an activator, thereby producing the species active towards olefin polymerization or oligomerization. Suitable activators are described in detail below.

As used herein, in reference to Periodic Table "Groups" of Elements, the "new" numbering scheme for the Periodic Table Groups is used as in the CRC Handbook of Chemistry and Physics (David R. Lide, ed., CRC Press $81^{st}$ ed. 2000).

The term "substituted" means that the group following that term possesses at least one moiety in place of one or more hydrogens in any position, the moieties selected from such groups as halogen radicals (for example, Cl, F, Br), hydroxyl groups, carbonyl groups, carboxyl groups, amine groups, phosphine groups, alkoxy groups, phenyl groups, naphthyl groups, C1 to C10 alkyl groups, C2 to C10 alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

Chromium Catalysts

Suitable chromium catalysts can include di-substituted chromates, such as $CrO_2(OR)_2$; where R is triphenylsilane or a tertiary polyalicyclic alkyl. The chromium catalyst system may further include $CrO_3$, chromocene, silyl chromate, chromyl chloride ($CrO_2Cl_2$), chromium-2-ethyl-hexanoate, chromium acetylacetonate ($Cr(AcAc)_3$), and the like.

Metallocenes

Metallocenes are generally described throughout in, for example, 1 & 2 Metallocene-Based Polyolefins (John Scheirs & W. Kaminsky, eds., John Wiley & Sons, Ltd. 2000); G. G. Hlatky in 181 Coordination Chem. Rev. 243-296 (1999) and in particular, for use in the synthesis of polyethylene in 1 Metallocene-Based Polyolefins 261-377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components". The metallocene catalyst component is supported on a support material in an embodiment, and may be supported with or without another catalyst component.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, or the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Or the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno [1,2-9]anthrene, thiophenoindenyl, thiophenofluorenyl, hydrogenated versions thereof (e.g., 4,5,6,7-tetrahydroindenyl, or "H4Ind"), substituted versions thereof, and heterocyclic versions thereof.

Group 15-Containing Catalyst

The "Group 15-containing catalyst" may include Group 3 to Group 12 metal complexes, wherein the metal is 2 to 8 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460; EP A1 0 893 454; U.S. Pat. No. 5,318,935; U.S. Pat. No. 5,889,128 U.S. Pat. No. 6,333,389 B2 and U.S. Pat. No. 6,271,325 B1. In one embodiment, the Group 15-containing catalyst includes a Group 4 imino-phenol complexes, Group 4 bis(amide) complexes, and Group 4 pyridyl-amide complexes that are active towards olefin polymerization to any extent.

Activator

The term "activator" includes any compound or combination of compounds, supported or unsupported, which can activate a single-site catalyst compound (e.g., metallocenes, Group 15-containing catalysts), such as by creating a cationic species from the catalyst component. Typically, this involves the abstraction of at least one leaving group (X group in the formulas/structures above) from the metal center of the catalyst component. The catalyst components of embodiments described are thus activated towards olefin polymerization using such activators. Embodiments of such activators include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cation that is active with respect to olefin polymerization.

Lewis acids may be used to activate the metallocenes described. Illustrative Lewis acids include, but are not limited to, alumoxane (e.g., "MAO"), modified alumoxane (e.g., "TIBAO"), and alkylaluminum compounds. Ionizing activators (neutral or ionic) such as tri (n-butyl)ammonium tetrakis (pentafluorophenyl)boron may be also be used. Further, a trisperfluorophenyl boron metalloid precursor may be used. Any of those activators/precursors can be used alone or in combination with the others.

MAO and other aluminum-based activators are known in the art. Ionizing activators are known in the art and are described by, for example, Eugene You-Xian Chen & Tobin J. Marks, Cocatalysts for Metal-Catalyzed Olefin Polymerization: Activators, Activation Processes, and Structure-Activity Relationships 100(4) Chemical Reviews 1391-1434 (2000). The activators may be associated with or bound to a support, either in association with the catalyst component (e.g., metallocene) or separate from the catalyst component, such as described by Gregory G. Hlatky, Heterogeneous Single-Site Catalysts for Olefin Polymerization 100(4) Chemical Reviews 1347-1374 (2000).

Ziegler-Natta Catalyst

Illustrative Ziegler-Natta catalyst compounds are disclosed in Ziegler Catalysts 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. No. 4,302,565; U.S. Pat. No. 5,518,973; U.S. Pat. No. 5,525,678; U.S. Pat. No. 5,288,933; U.S. Pat. No. 5,290,745; U.S. Pat. No. 5,093,415 and U.S. Pat. No. 6,562,905. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Conventional-type transition metal catalysts are those traditional Ziegler-Natta catalysts that are well known in the art. Examples of conventional-type transition metal catalysts are discussed in U.S. Pat. Nos. 4,115,639, 4,077,904, 4,482,687, 4,564,605, 4,721,763, 4,879,359 and 4,960,741. The conventional-type transition metal catalyst compounds that may be used include transition metal compounds from Groups 3 to 17, or Groups 4 to 12, or Groups 4 to 6 of the Periodic Table of Elements.

These conventional-type transition metal catalysts may be represented by the formula: $MR_x$, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3.1/3AlCl_3$ and $Ti(OCl_2H_{25})Cl_3$.

Conventional-type transition metal catalyst compounds based on magnesium/titanium electron-donor complexes are described in, for example, U.S. Pat. Nos. 4,302,565 and 4,302,566. Catalysts derived from Mg/Ti/Cl/THF are also contemplated, which are well known to those of ordinary skill in the art. One example of the general method of preparation of such a catalyst includes the following: dissolve $TiCl_4$ in THF, reduce the compound to $TiCl_3$ using Mg, add $MgCl_2$, and remove the solvent.

Conventional-type cocatalyst compounds for the above conventional-type transition metal catalyst compounds may be represented by the formula $M3M4vX2cR3b-c$, wherein M3 is a metal from Group 1 to 3 and 12 to 13 of the Periodic Table of Elements; M4 is a metal of Group 1 of the Periodic Table of Elements; v is a number from 0 to 1; each X2 is any halogen; c is a number from 0 to 3; each R3 is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M3R3k$, where M3 is a Group IA, IIA, IIB or IIIA metal, such as lithium, sodium, beryllium, barium, boron, aluminum, zinc, cadmium, and gallium; k equals 1, 2 or 3 depending upon the valency of M3 which valency in turn normally depends upon the particular Group to which M3 belongs; and each R3 may be any monovalent radical that include hydrocarbon radicals and hydrocarbon radicals containing a Group 13 to 16 element like fluoride, aluminum or oxygen or a combination thereof.

Mixed Catalyst

The mixed catalyst can be a bimetallic catalyst composition or a multi-catalyst composition. As used herein, the terms "bimetallic catalyst composition" and "bimetallic catalyst" include any composition, mixture, or system that includes two or more different catalyst components, each having a different metal group. The terms "multi-catalyst composition" and "multi-catalyst" include any composition, mixture, or system that includes two or more different catalyst components regardless of the metals. Therefore, the terms "bimetallic catalyst composition," "bimetallic catalyst," "multi-catalyst composition," and "multi-catalyst" will be collectively referred to herein as a "mixed catalyst" unless specifically noted otherwise. In one preferred embodiment, the mixed catalyst includes at least one metallocene catalyst component and at least one non-metallocene component.

Heat Removal Measurement

It is believed that the rate of polymer production decreases due to poor catalyst dispersion. As mentioned above, increased monomer flow through a concentric flow path on the injection nozzle helps disperse the catalyst flow through another concentric flow path on the same injection nozzle. The increased monomer flow helps prevent agglomeration at or on the nozzle itself which can block or prevent the catalyst injection into the reactor. The increased monomer flow also provides secondary atomization of the catalyst particles into the reactor. Therefore, increasing the flow of monomer increases the energy for atomization, providing better catalyst dispersion.

In one or more embodiments, information about catalyst dispersion is monitored or detected by fluctuations in polymerization rates. Fluctuations in polymerization rates are detected by monitoring the heat balance of the process. From the heat balance, the rate of heat removal can be determined and monitored.

Referring again to FIG. 2, the fluidized bed in the reaction zone 245 is maintained at a relatively constant height by withdrawing a portion of the bed as product. Product is withdrawn at the rate of formation of the particulate polymer product. The rate of heat removal is directly related to the rate of product formation ("production rate") which is directly related to the rate of heat generation. In one or more embodiments, the rate of heat generation is the difference between the reactor inlet fluid temperature and the reactor exit fluid temperature per time at a constant fluid velocity if no or negligible vaporizable liquid is present in the inlet fluid. If vaporizable liquid is present in the inlet fluid then the calculation of rate of heat generation should also include the heat of vaporization of that liquid flowing into the reactor.

In one or more embodiments, the rate of heat removal can be measured through the temperature rise of the fluid across the reactor and knowledge of the heat capacity of the fluid under the operating conditions. In one or more embodiments, the heat of reaction can be removed (i.e. heat removal) by cooling the recycle gas stream in the recycle gas heat exchanger.

In one or more embodiments, changes in the polymerization ("production") rate can be estimated by monitoring changes in the recycle gas temperature, assuming that the gas composition and heat capacity are constant or substantially constant (i.e. less than 5% fluctuation). An indication of poor catalyst dispersion occurs if the catalyst feed rate and reaction conditions are constant or substantially constant (i.e. less than 5% fluctuation), and the production rate of heat removal decreases by more than about 10% for a single-injection tube system or 5% for a two-tube system (etc).

In response, the flow of monomer through the nozzle can be increased. In one or more embodiments, the monomer flow rate is increased if the rate of heat removal decreases by at least 5% over a 5 to 10 minute interval. In one or more embodiments, the monomer flow rate is increased if the rate of heat removal decreases by at least 10% over a 5 to 10 minute interval. In one or more embodiments, the monomer flow rate is increased if the rate of heat removal decreases by at least 15% over a 5 to 10 minute interval.

In one or more embodiments, the flow of monomer is increased by about 10% in 5 to 10 minute increments until the rate of heat removal stabilizes. In one or more embodiments, the monomer flow rate can be increased from about 5% to about 10% in 5 to 10 minute increments until the rate of heat removal stabilizes. In one or more embodiments, the monomer flow rate can be increased from about 10% to about 15% in 5 to 10 minute increments until the rate of heat removal stabilizes. In one or more embodiments, the monomer flow rate can be increased from about 5% to about 20% in 5 to 10 minute increments until the rate of heat removal stabilizes. A stabilized heat of removal indicates the catalyst is being dispersed properly.

Control System

The flow rate adjustment of the one or more monomers can be made manually or automatically using a feedback control loop that is operated by a control unit. For example, a conventional data processor, including a CPU, memory, I/O, program storage, a connecting bus, and other appropriate components, could be programmed or otherwise designed to facilitate the practice of the method of the invention.

An illustrative control unit is depicted in FIG. 2. In one or more embodiments, the control unit can include a controller 290 that is electrically coupled to one or more components of the polymerization system 200 including one or more thermocouples on the reactor 245 and the three-way valve 115 in communication with each of the feed lines 120A, 140A, 150A. Bi-directional communications between the controller 290 and the one or more components can be handled through numerous signal cables collectively referred to as signal buses 295, some of which are illustrated in FIG. 2.

Considering the controller 290 in more detail, the controller 290 can include a central processing unit (CPU) 294, support circuits 296 for the CPU 294, and memory 298 that can contain associated control software 299. The CPU 294 can be one of any form of general purpose computer processor that can be used in an industrial setting for controlling various process equipment and sub-processors. The memory 298 is coupled to the CPU 294. The memory 298, or computer-readable medium, can be one or more of readily available memory such as random access memory (RAM), read only memory (ROM), floppy disk, hard disk, or any other form of digital storage, local or remote.

The support circuits 296 are coupled to the CPU 294 for supporting the processor in a conventional manner. These circuits 296 include cache, power supplies, clock circuits, input/output circuitry and subsystems, and the like.

In one or more embodiments, the control software 299 can be stored in the memory 298 as a software routine. The software routine can include the method for monitoring catalyst dispersion, production rate, rate of heat removal, and heat of reaction, as described herein in addition to a plurality of other control, monitoring and operating software. The software routines can also be stored and/or executed by a second CPU (not shown) that is remotely located.

It will be understood by a person of ordinary skill in the art that an article of manufacture, such as a pre-recorded disk or other similar computer program product, for use with a data processing system, could include a storage medium and program means recorded thereon for directing a data processing system to facilitate the practice of the method of the invention. It will be understood that such apparatus and articles of manufacture also fall within the spirit and scope of the invention.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for olefin polymerization, comprising:
   polymerizing one or more olefins within a reactor having one or more injection tubes in fluid communication therewith, at least one of the one or more injection tubes having two or more concentric flow paths;
   flowing a catalyst through a first concentric flow path of the injection tube into the reactor;
   flowing one or more monomers through a second concentric flow path of the injection tube into the reactor;
   measuring a rate of heat removal within the reactor; and
   adjusting the flow of the one or more monomers through the injection tube in response to the rate of heat removal in the reactor.

2. The method of claim 1, wherein measuring the rate of heat removal within the reactor comprises determining the heat of reaction.

3. The method of claim 1, wherein adjusting the flow of the one or more monomers comprises increasing the flow of the one or more monomers when the rate of heat removal decreases by at least 5% over a 5 to 10 minute interval.

4. The method of claim 1, wherein adjusting the flow of the one or more monomers comprises increasing the flow of the one or more monomers when the rate of heat removal decreases by at least 10% over a 5 to 10 minute interval.

5. The method of claim 1, wherein adjusting the flow of the one or more monomers comprises increasing the flow of the one or more monomers when the rate of heat removal decreases by at least 15% over a 5 to 10 minute interval.

6. The method of claim 1, wherein the flow of the one or more monomers through the injection tube comprises less than about 30% by weight of the one or more monomers consumed in the reactor.

7. The method of claim 1, wherein the flow of the one or more monomers through the injection tube comprises less than about 25% by weight of the one or more monomers consumed in the reactor.

8. The method of claim 1, wherein the flow of the one or more monomers through the injection tube comprises less than about 20% by weight of the one or more monomers consumed in the reactor.

9. The method of claim 1, wherein the one or more monomers is selected from the group consisting of ethylene, propylene, butene, pentene, 4-methyl-1-pentene, hexene, octene, decene, 1-dodecene, styrene, and derivatives thereof.

10. The method of claim 1, wherein the one or more monomers comprises ethylene.

11. The method of claim 1, wherein the catalyst comprises at least one of a Ziegler-Natta catalyst, a chromium-based catalyst, a metallocene catalyst, another single-site catalyst, a bimetallic catalyst, or combinations thereof.

12. The method of claim 1, wherein the catalyst comprises at least one metallocene catalyst component and at least one non-metallocene component.

13. The method of claim 1, wherein the catalyst comprises at least one metallocene catalyst component and at least one Group 15-containing catalyst component.

14. The method of claim 13, wherein the at least one Group 15-containing catalyst component comprises a Group 4 imino-phenol complex, Group 4 bis(amide) complex, or Group 4 pyridyl-amide complex.

15. The method of claim 1, wherein the catalyst is a slurry.

16. The method of claim 1, wherein the catalyst is a slurry of catalyst particles and inert liquid.

17. A method for controlling an olefin polymerization reaction, comprising:
- polymerizing one or more olefins within a reactor having one or more injection tubes in fluid communication therewith, at least one of the one or more injection tubes having two or more concentric flow paths;
- flowing a catalyst through a first concentric flow path of the injection tube into the reactor;
- flowing one or more monomers through a second concentric flow path of the injection tube into the reactor;
- measuring a rate of heat removal within the reactor; and
- adjusting the flow of one or more monomers through the injection tube in response to the rate of heat removal in the reactor.

18. The method of claim 17, wherein the flow of the one or more monomers through the injection tube comprises less than about 30% by weight of the one or more monomers consumed in the reactor.

19. The method of claim 17, wherein the flow of the one or more monomers through the injection tube comprises less than about 25% by weight of the one or more monomers consumed in the reactor.

20. The method of claim 17, wherein the flow of the one or more monomers through the injection tube comprises less than about 20% by weight of the one or more monomers consumed in the reactor.

21. The method of claim 17, wherein the catalyst comprises at least one of a Ziegler-Natta catalyst, a chromium-based catalyst, a metallocene catalyst, another single-site catalyst, a bimetallic catalyst, or combinations thereof.

22. The method of claim 17, wherein the catalyst comprises at least one metallocene catalyst component and at least one non-metallocene component.

23. The method of claim 17, wherein the catalyst comprises at least one metallocene catalyst component and at least one Group 15-containing catalyst component.

24. The method of claim 23, wherein the at least one Group 15-containing catalyst component comprises a Group 4 imino-phenol complex, Group 4 bis(amide) complex, or Group 4 pyridyl-amide complex.

25. The method of claim 17, wherein monitoring the rate of heat removal comprises monitoring recycle gas temperature.

26. The method of claim 17, wherein adjusting the flow of the one or more monomers comprises increasing the flow of the one or more monomers when the rate of heat removal decreases by at least 10% over a 5 to 10 minute interval.

27. The method of claim 17, wherein an electronic signal indicative of the measured rate of heat removal is sent to a control system which operates in a manner to control the flow of the one or more monomers through the injection tube in response to the rate of heat removal in the reactor.

28. A reaction system for olefin polymerization, comprising:
- a reactor having a fluidized bed comprising polymer particles;
- one or more injection tubes in fluid communication with the reactor, at least one of the one or more injection tubes having two or more concentric flow paths, wherein a first concentric flow path is adapted to deliver a liquid catalyst system to the reactor and a second concentric flow path is adapted to deliver one or more monomers to the reactor;
- means for separating the polymer particles;
- a recycle gas stream; and
- means for measuring a rate of heat removal within the reactor.

29. The reaction system of claim 28, further comprising means for generating an electronic signal indicative of the measured rate of heat removal and transmitting the signal to a control system which operates in a manner to control a flow of one or more monomers to the reactor in response to the rate of heat removal within the reactor.

30. The reaction system of claim 28, wherein the one or more injection tubes comprise less than about 30% by weight of the one or more monomers consumed in the reactor.

* * * * *